United States Patent
Shirasawa

[11] Patent Number: 5,850,765
[45] Date of Patent: Dec. 22, 1998

[54] FLAT WAVE GEAR DRIVE

[75] Inventor: Naomi Shirasawa, Nagano-ken, Japan

[73] Assignee: Harmonic Drive Systems, Inc., Tokyo, Japan

[21] Appl. No.: 765,923
[22] PCT Filed: May 17, 1996
[86] PCT No.: PCT/JP96/01309
  § 371 Date: Feb. 26, 1997
  § 102(e) Date: Feb. 26, 1997
[87] PCT Pub. No.: WO96/36822
  PCT Pub. Date: Nov. 21, 1996

[30] Foreign Application Priority Data

May 19, 1995 [JP] Japan ................................. 7-120957

[51] Int. Cl.⁶ .................................................. F16H 1/32
[52] U.S. Cl. ........................................... 74/640; 475/162
[58] Field of Search ..................... 74/640, 462; 475/162, 475/168

[56] References Cited

U.S. PATENT DOCUMENTS

| | | | |
|---|---|---|---|
| 4,770,059 | 9/1988 | Beyer ......................................... | 74/640 |
| 4,784,014 | 11/1988 | Bruns et al. ................................ | 74/640 |
| 4,825,720 | 5/1989 | Capdepuy ................................. | 74/640 |
| 4,840,090 | 6/1989 | Iwata ..................................... | 74/640 X |
| 5,222,409 | 6/1993 | Dalakian ............................... | 74/640 X |
| 5,269,202 | 12/1993 | Kiyosawa et al. ......................... | 74/640 |
| 5,470,283 | 11/1995 | Seidou .................................... | 475/162 |
| 5,687,620 | 11/1997 | Ishikawa ................................... | 74/640 |

FOREIGN PATENT DOCUMENTS

| | | |
|---|---|---|
| 59-166747 | 9/1984 | Japan . |
| 3-134345 | 6/1991 | Japan . |
| 8-166051 | 6/1996 | Japan . |
| 8-166052 | 6/1996 | Japan . |

Primary Examiner—Dirk Wright
Assistant Examiner—Peter T. Kwon
Attorney, Agent, or Firm—Burns, Doane, Swecker & Mathis LLP

[57] ABSTRACT

A flat wave gear drive (1) which has an input shaft (4) supported rotatably at both ends portions thereof between first and second end plates (2, 3). A wave gear mechanism is incorporated between these end plates (2,3), and a cross roller bearing (8) is provided on an outer circumferential side of the wave gear mechanism. The wave gear mechanism comprises a rigid internal gear (5), a silk-hat-shaped flexible external gear (6) provided on the inner side of the internal gear, and an wave generator (7) provided on the inner side of the external gear (6). An annular boss (64) of the flexible external gear is held between an outer ring (81) of the cross roller bearing (8) and the second end plate (3), whereby these three members are fastened to one another. The rigid internal gear (5) is held between an inner ring (82) of the cross roller bearing (8) and the first end plate (2), whereby these three members are fastened to one another. The input shaft (4) may comprise a hollow shaft. Owing to the employment of such a structure, the device as a whole can be formed flat and to a length slightly larger than the axial length of the flexible external gear. Since the outer ring of the cross roller bearing can be used also as a housing of the device, the device can be formed compactly by a reduced number of parts.

7 Claims, 7 Drawing Sheets

FLAT WAVE GEAR DRIVE

TECHNICAL FIELD

This invention relates to a wave gear drive, and particularly to a flat wave gear drive which can be formed compactly and cheaply by a reduced number of parts.

BACKGROUND OF THE INVENTION

There have been known wave gear drives having a flexible external gear of the type which has an annular shape, a cup shape, or a silk-hat shape. Among those gear drives, the applicant of the present patent application proposes a wave gear drive having a flat silk-hat-shaped flexible external gear in Japanese Patent Application Nos. HEI 6-310834 and HEI 6-310835. A wave gear drive can be formed flat by using this type of flat silk-hat-shaped flexible external gear.

SUMMARY OF THE INVENTION

An object of the present invention is to make flat, to make small and compactly and to reduce manufacturing cost of the wave gear drive having a silk-hat-shaped flexible external gear. In particular, an object of the present invention is to realize a flat wave gear drive having a structure suitable for adopting the above-mentioned flat silk-hat-shaped flexible external gear.

In order to realize the above objects, in a flat wave gear drive according to the present invention, a device is defined at both ends thereof in an axial direction by a first and a second end plates, respectively, between which a silk-hat-shaped flexible external gear is incorporated, which comprises an annular body, external teeth formed on an outer circumferential surface of an opening end at the side of the first end plate of the body, an annular diaphragm extending continuously and outwardly along the radial direction from an opening end at the side of the second end plate of the body, and an annular thick boss extending from the outer edge of the diaphragm. A rigid internal gear is provided around the external teeth, which is formed at an inner circumferential surface thereof with internal teeth engageable with the external teeth. A wave generator is provided inside the annular body where the external teeth are formed, which flexes the annular body radially to engage the external teeth with the internal teeth partially and moves the tooth-engaged portions along a circumferential direction. Further, an input shaft is provided in a state extending along the axial direction, which is fixed to the wave generator and is rotatably supported at one end thereof by the first end plate, while is rotatably supported at the other end thereof by the second end plate. A bearing is provided around the annular body of the flexible external gear, in which its outer ring is fixed via the annular boss to the second end plate and its inner ring is fixed via the rigid internal gear to the first end plate.

The bearing is preferably a cross roller bearing. It is preferred in this case that the cross roller bearing is provided between the annular boss of the flexible external gear and the circular rigid internal gear, wherein the outer ring of the bearing, the second end plate and the annular boss are fastened to one another such that the annular boss is sandwiched between the circular end surface of the outer ring of the bearing and the inner circular end surface of the second end plate, and the inner ring of the bearing, the first end plate and the rigid internal gear is fastened to one another such that the rigid internal gear is sandwiched between the circular end surface of the inner ring of the bearing and the inner circular end surface of the first end plate.

Furthermore, where the input shaft is a hollow input shaft, it is preferred that a through hole is formed extending through the device along its axial direction.

In the flat wave gear drive according to the present invention, both axial ends thereof are defined by the first and second end plates. Between the first and second end plates, the components of the wave gear drive, namely the flexible external gear, rigid internal gear and wave generator are arranged. The bearing is provided around the flexible external gear, wherein the inner and outer rings thereof are fixed at the sides of the first and second end plates. In addition, both ends of the input shaft for rotating the wave generator are supported rotatably by the first and second end plates in a both-end supported condition.

Accordingly, the outer ring of the bearing is held at the utmost side between first and second end plates, and is doubled as a housing of the device. There is no need to provide another member at the housing. Shortening of the axial length of the annular body of the flexible external gear makes it possible to constitute the wave gear drive flat. Hence, adopting the flat silk-hat-shaped flexible external gear which has been proposed by the applicant of the present application makes it possible to constitute the wave gear drive extremely flat.

Since the flexible external gear is of the silk hat shape and the annular thick boss formed on the outer end of its diaphragm is held just between the first end plate and the outer ring of the bearing, these three members can easily be integrated by providing these members with bolt holes for fastening bolts. Thus, the respective members can be made simple in shape.

Further, since the inner ring of the bearing faces at its circular end surface against the circular end surface of the rigid internal gear or the first end plate, these members can also be integrated in a simple manner by using fastening bolts or the like.

On the other hand, where the input shaft is a hollow input shaft, the hollow portion can be utilized to accommodate another member and to arrange electrical wires, so that advantages can be obtained such that layout flexibility and the like increase.

Figure 1C:
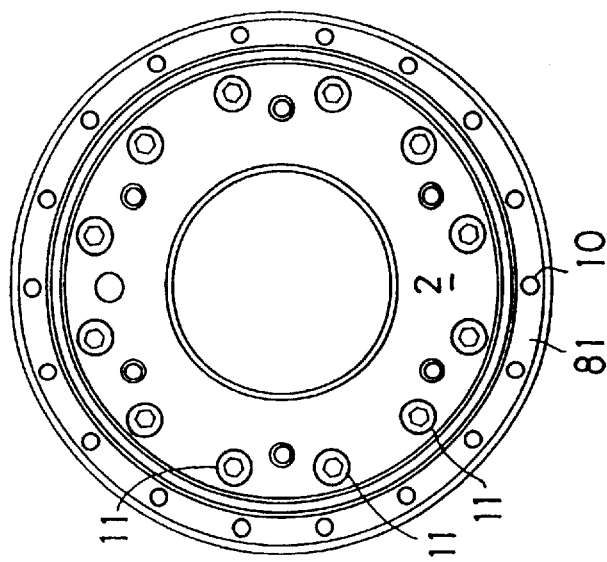
FIG. 1 shows a wave gear drive of a first embodiment according to the present invention, wherein (A) is a side view viewed from arrow A, (B) is a longitudinal sectional view taken along the axial direction, and (C) is a side view viewed from arrow C.

FIG, 7 shows a wave gear of a fourth embodiment according to the present invention, wherein (A) is a side view viewed for arrow A, (B) is a longitudinal sectional view taken along the axial direction, and (C) is a side view viewed from arrow C.

BEST MODE FOR CARRYING OUT THE INVENTION

Now, referring to the drawings, embodiments of the present invention will be explained.
(First Embodiment)

Figure 1B:
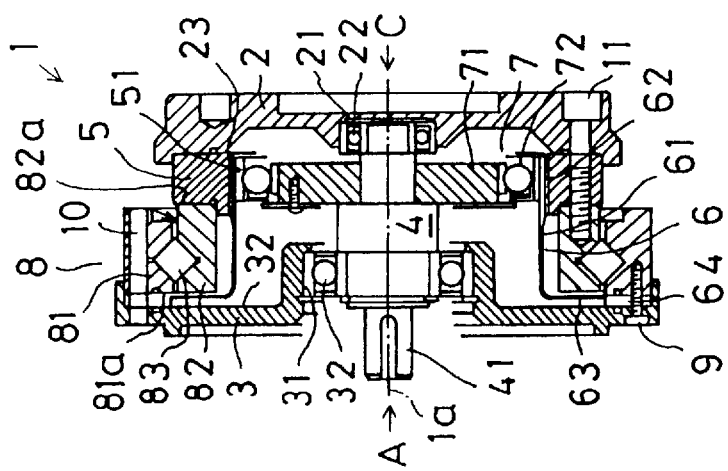
Figure 1A:
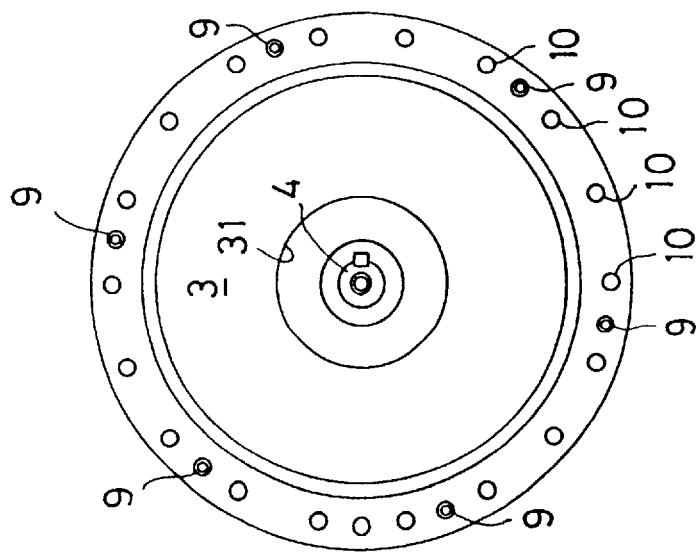

FIG. 1 shows a first embodiment of the wave gear drive to which the present invention is applied.

The wave gear drive 1 of this embodiment has a first and a second end plates 2 and 3 defining both ends thereof in an axial direction 1a. The first end plate 2 is formed at its center of the inside end surface with a circular groove 21, an inner circumferential surface of which supports rotatably one end of an input shaft 4 via a bearing 22, the input shaft 4 being arranged along the axial direction 1a. At the side of the second end plate 3, a through hole 31 is formed at its center, an inner circumferential surface of which supports rotatably an end portion of the input shaft 4 via a bearing 32. The input shaft 4 projects at its end 41 outward from the through hole 31.

A wave gear mechanism is accommodated between the end plates 2 and 3. This wave gear mechanism is constituted by circular rigid internal gear 5, a silk-hat-shaped flexible external gear 6 and a wave generator 7. The flexible external gear 6 has an annular body 61, external teeth 62 formed on the outer circumferential surface at an opening end of the body, annular diaphragm 63 extending outward from an perpendicularly to the opening end of the other side, and an annular thick boss 64 extending from the outer edge of the diaphragm 63. The rigid internal gear 5 is provided around the external teeth 62, an inner surface of which is formed with internal teeth 51 engageable with the external teeth 62. The wave generator 7 is fixed inside the body 61 where the external teeth 62 are formed.

The wave generator 7 has a rigid cam plate 71 of elliptical shape and a bearing 72 fixed around the cam plate 71. The above-mentioned input shaft 4 penetrates through the center of the rigid cam plate 71 and is fixed thereto. With the wave generator 7, the portion of the flexible external gear where the external teeth 62 are formed is flexed elliptically, so that the teeth located on its major axis come into a condition engaged with the internal teeth. The wave generator 7 is rotated in accordance with rotation of the input shaft 4, and as the wave generator rotates, the engaged portions between the external and internal teeth 62 and 51 are moved along the circumferential direction. Since the number of teeth of the external teeth 62 is typically two fewer than that of the internal teeth 51, relative rotation between the external and internal gears which is extremely reduced in speed compared to the input rotation occurs in response to the movement of the engaged portions between the external and the internal teeth. This relative rotation can be extracted from the side of the internal or external gear. Since the speed reduction mechanism is well known, the detailed explanation is deleted here in this specification.

Next, at the side of the outer circumferential surface of the body 61 of the flexible external gear, there is provided a cross roller bearing 8 between the second end plate 3 and the rigid internal gear 5. The cross roller bearing 8 is constituted by an outer ring 81, an inner ring 82, and rollers 83 arranged rotatably in a circular groove formed between the outer and inner rings in a manner that they cross with one another by turns.

In this embodiment, the annular boss 64 of the flexible external gear 6 is disposed in a manner that it is sandwiched from both sides by a circular end surface 81a of the outer ring 81 of the cross roller bearing 8 and an inner-side end surface 32a of the second end plate 3 facing to the circular end surface 81a. These three members are formed therein with a plurality of fastening-bolt holes along the circumferential direction, and are fastened to one another by fastening bolts 9 inserted into the holes. In addition, a plurality of bolt holes 10 are also formed passing through these three members, and the wave gear drive 1 of this embodiment can be mounted on a housing of a motor (not shown) or the like by utilizing these holes 10.

On the other hand, there is provided the rigid internal gear 5 in a manner that it is sandwiched from both sides between the circular end surface 82a of the inner ring 82 of the cross roller bearing 8 and the circular end surface 23 of the first end plate 2 facing to the end surface 82a. These three members are fastened to one another by fastening bolts 11.
(Sectional Shape of the Silk-Hat-Shaped Flexible External Gear)

Figure 2:
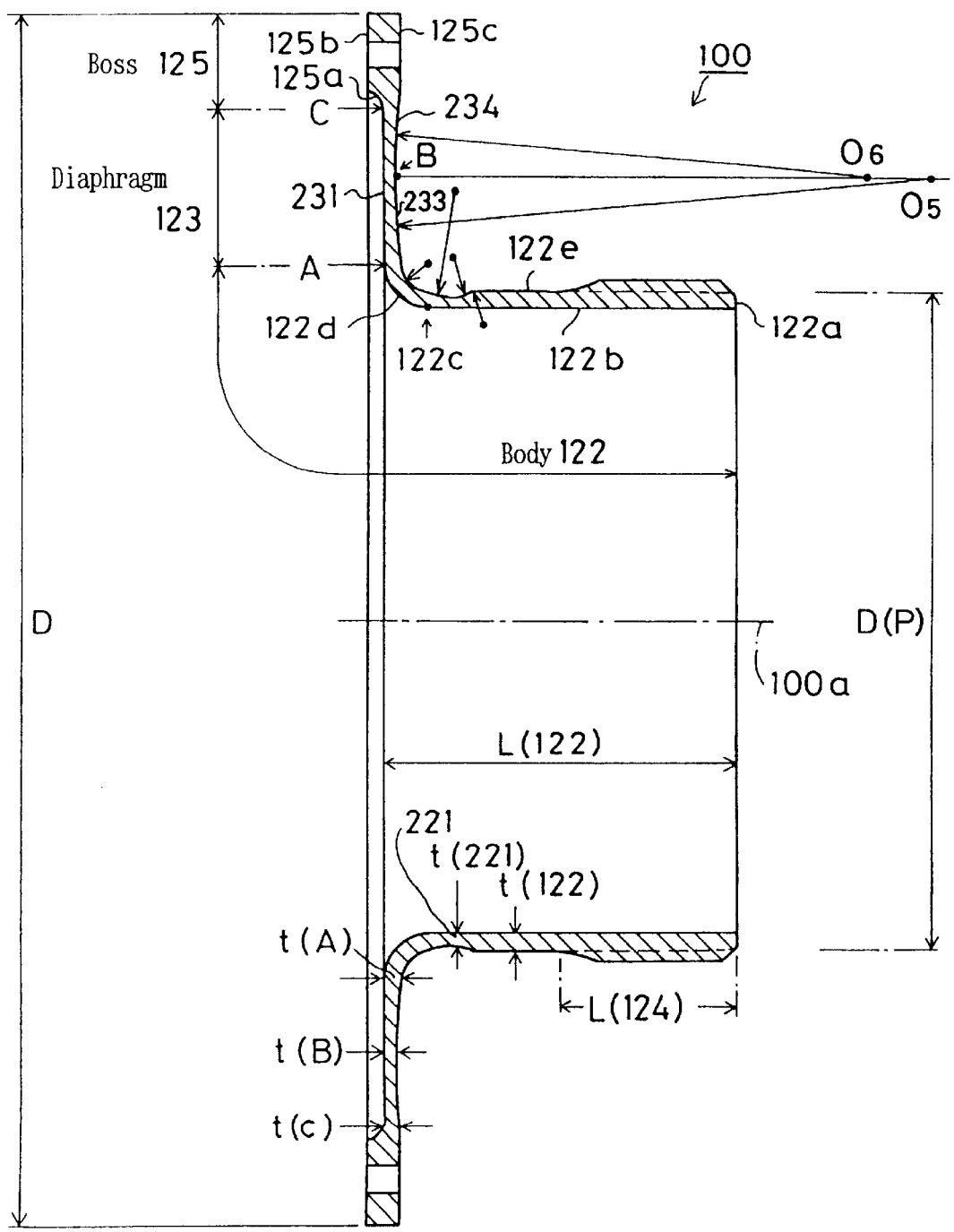
FIG. 2 is a longitudinal sectional view of a flexible external gear which can be adopted to the drive of FIG. 1
Figure 3:
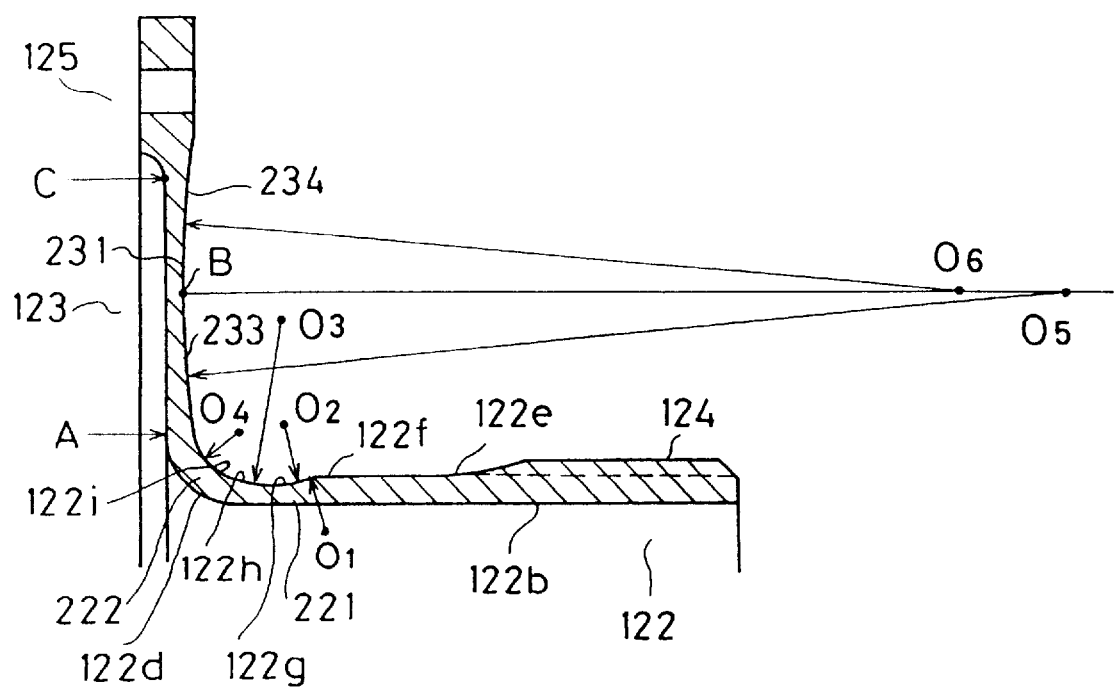
FIG. 3 is an enlarged sectional view showing the flexible external gear of FIG. 2 in an enlarged scale.

As the silk-hat-shaped flexible external gear 6 used for this embodiment, that of the type having the following sectional shape is preferable. FIG 2 is a diagram showing the longitudinal section of a short flexible external gear 100 which is suitable for use in as the above silk-hat-shaped flexible external gear 6, the section being taken along a plane including the axial line 100a of the device. While, FIG. 3 shows a diaphragm of the flexible external gear 100 in an enlarged scale.

The sectional shape of each portion is as follows when viewed along a plane including the axial line 100a. First, an inner circumferential surface of a body 122 of the external gear 100 is defined by a straight line 122b parallel to the axial line 100a and starting from an distal-side opening edge 122a. The straight line 122b is continued at its proximal-side point 122c smoothly into an arc 122d. The other side of the arc 122d is continued smoothly at point A into a straight line 231 which defines an rear surface of a diaphragm 123 and is perpendicular to the axial line 100a. The other end, namely the outer end of the straight line 231 is continued smoothly at point C into an arch 125a which is continued into the rear surface side of a boss 125. The other end of the arc 125a is continued into a straight line 125b perpendicular to the axial line 100a.

On the other hand, an outer circumferential surface of the body 122 of the external gear 100 is generally defined by a straight line 122e parallel to the straight line 122b of the inner circumferential surface side. The body 122 is formed integrelly at its distal-side outer circumferential surface with the external teeth 124. The straight line 122e is smoothly connected at its end to a convex arc 122f having a center at point 01. The arc 122f is smoothly connected to a concave arc 122g having a center at point 02. The arc 122g, in turn, is smoothly connected to a concave arc 122h whose curvature is smaller than that of the arc 122f and whose center is at point 03. The concave arc 122h is smoothly connected to a concave arc 122i whose curvature is larger than that of the arc 122h and whose center is at point 04. Accordingly, the proximal-side portion of the boy 122 is formed with a thinned portion defined by the arc 122g, the thickness of which is less than the thickness t(122) of the body 22 defined by the straight lines 122b and 122e.

The arc 122i is smoothly connected to an arc 233 defining a surface side of the diaphragm 123 and having a center at point 05. The arc 233 is smoothly connected at an approximately center point, namely the middle point between points A and B, to an arc 234 whose curvature is slightly larger than that of the arc 233 and whose center is at point 06. The arc 234 is smoothly connected at the other end to a straight line 125c perpendicular to the axis 100a defining the surface of the boss 125.

As mentioned above, the diaphragm 123 is defined by the straight line at the rear-surface side and by the two arcs 233 and 234 at the front-surface side. These two arcs 233 and 234 are connected with each other at point B which is the middle point of the diaphragm 123. Therefore, the diaphragm 123 defined by these straight line and the arcs has the smallest thickness t(B) at the middle thereof, namely point B. While, the thickness t(A) of point A which is the inner circumferential end of the diaphragm 123 is the greatest thickness. The thickness t(C) of point C which is the outer circumferential end of the diaphragm 123 is slightly thinner than the thickness t(A).

In the wave gear drive incorporated therein with the flexible external gear 100 defined to have the sectional shape described in the foregoing, the distribution of the stress produced in the diaphragm 123 during operation is smoother and more uniform than in the prior art. Moreover, the concentration of stress at the inner edge and the outer edge is thoroughly relieved. Hence, the outer diameter of the diaphragm 123 can be made smaller than in the prior art. In other words, the outer diameter of the device indicated as D in FIG. 2 can be reduced. Since the stress produced in the diaphragm 123 can be reduced, the length L(122) can also be shortened.

While, the thinned portion is formed on the portion continuing into the inner edge of the diaphragm 123 of the body 122. According to tests, the portion continuing to the inner edge is that where the stress produced is small. This portion is made thinner than the adjacent portions of the body 122, so that the distribution of stress from the body 122 to the diaphragm 123 can be made uniform.

According to tests, when the thickness at point A and point C are set within the following ranges relative to the smallest thickness t(B), the stress distribution becomes smooth between the inner edge and the outer edge of the diaphragm 123 and the concentration of stress at the inner edge and the outer edge is relieved.

$1.5 < t(A)/t(B) < 2.2$ $1.4 < t(C)/t(B) < 2.0$

Two arcs 233 and 234 are used to define the thickness of the diaphragm 123. However, it is also possible to use three or more arcs to define the thickness of the diaphragm 123. While, the rear surface of the diaphragm 123 is defined by the straight line 231, it can instead be defined by curved lines and the front surface be defined by a straight line. It is also possible to define a sectional shape satisfying the aforesaid conditions by defining both surfaces of the diaphragm 123 with curved lines.

In addition, although the tinned portion is formed on the outer circumferential surface of the body 122, it is possible instead to form a thinned portion on the inner circumferential surface side of the body 122. Alternatively, it is possible to form a thinned portion by defining the outer and inner circumferential surfaces of a portion to be thinned by concave curved lines.

Tests and the like showed that the thickness t(221) of the thinned portion 221 of the body 122 is preferably set at about 80% of the thickness t(122) of the body 122.

Figure 4:
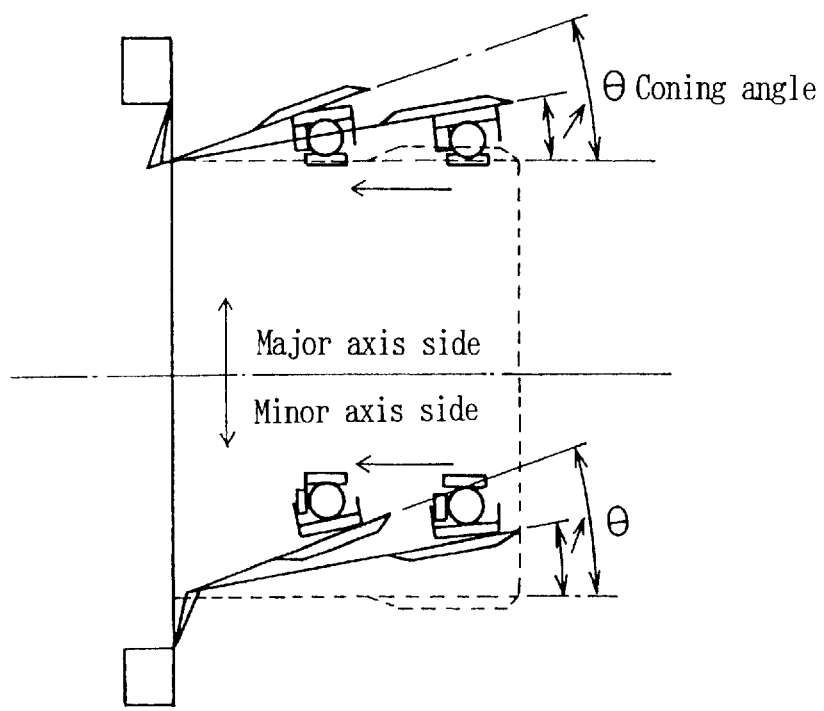
FIG. 4 is a diagram illustrating coning occurred in the flexible external gear.

The coning of the flexible external gear 100 in the silk-hat wave gear drive will now be considered. The flexible external gear 100 is repeatedly flexed into elliptical shape by the wave generator fitted therein. To reduce the coning force acting on the ball bearing of the wave generator as a result of this deformation, i.e. coning, it is preferable to shorten the length (tooth length) L(124) of the external teeth 124 in the tooth trace direction. When the tooth length L(124) is shortened, the axial length L(124) of the body 122 can also be shortened by a corresponding amount. In other words, a flexible meshing gear device of short axial length can be realized. When the axial length is shortened, however, the coning angle θ of the flexible external gear 100 increases as shown in FIG. 4. As a result, increased stress is produced in the diaphragm 123.

It has been found, however, that when the thickness of the different portions of the flexible external gear 100 are defined as in the foregoing, excessive stress concentration does not arise and a smooth distribution of the produced stress can be achieved even if the axial length is shortened.

The length L(122) of the body 122 of the flexible external gear 100 is preferably set in the approximate range of 20–70% of the opening of the external teeth, namely the pitch circle diameter D(P) of the external teeth. It is also preferable that form the practical viewpoint the length L(124) of the external teeth in the tooth trace direction should be set in the approximate range of 10–30% of the pitch circle diameter D(P).

As aforesaid, the thickness of the diaphragm of the silk-hat flexible gear is defined such that the middle portion is thinner, the inner edge is thickest and the outer edge is thinner than the inner edge but thicker than the middle portion and such that this thickness pattern is obtained by smooth thickness variation from the inner edge to the outer edge. Accordingly, the stress concentration of the inner and outer edges of the diaphragm can be relieved and the stress distribution produced in the diaphragm can be made uniform. As a result, the outer diameter of the diaphragm can be reduced. Since excessive stress concentration produced in the inner and outer edges of the diaphragm can be avoided even if the length of the body is shortened, the flexible external gear of short axial length can also be realized.

Further, the end of the body of the silk-hat-shaped flexible external gear on the side of the diaphragm is formed with a curved portion curving perpendicularly to the device axis so as to continue smoothly into the inner edge of the diaphragm and the portion of the body adjacent to the start of the curved portion is constituted as a thinned portion of less thickness than the portion adjacent thereto. Forming the thinned portion at this location relieves the concentration of stress at the inner edge and outer edge of the diaphragm and results in a smooth overall stress distribution. As a result, it is possible to use a shorter flexible external gear than in the past.

The body length is set within the approximate range of 0.2–0.7 of the pitch circle diameter of the external teeth of the external gear and the length of the external teeth in the direction of the trace is set within the approximate range of 0.1–0.3 of the pitch circle diameter of the external teeth. As a result, proper meshing of the external and internal teeth can be maintained despite increases in the coning angle of the flexible external gear.

Furthermore, the sectional shape of the diaphragm of the external gear taken along a plane including the device axis is set such that, when the thickness of the inner edge is t(A), the thickness of the other edge is t(C) and the thickness of the middle portion between the inner and outer edges is t(B), t(A) is the greatest thickness, t(B) is the smallest thickness, and t(A)>t(C)>t(B). With this constitution, the stress concentration of the inner and outer edges can be further relieved and also the stress distribution can be further smoothed.

As mentioned above, when the flexible external gear of sectional shape as shown in FIG. 2 is adopted, not only the outer diameter thereof but also the axial length thereof can be reduced.

(Effects of Embodiment 1)

As explained in the foregoing, in the wave gear drive 1 according the first embodiment, the input shaft is supported rotatably at both end portions thereof between the first and the second end plates, the silk-hat-shaped flexible external gear is incorporated between then, and the cross roller bearing is arranged between the boss of the external gear and the rigid internal gear. The outer ring of the cross roller bearing functions as a housing covering the outer circumferential side of the device. Thus, it is not necessary to arrange another member as the device housing. Further, the distance of the end plates, namely the axial length of the device depends on the axial length of the silk-hat-shaped flexible external gear. When the external gear of short-body type proposed beforehand by the applicant of this application is used, an extremely flat wave gear drive can be realized. Furthermore, without modifying the shape and the like of the rigid internal gear, flexible external gear and wave generator which are the main components of the wave gear mechanism, only the both-side end plates are exchanged to change the projecting direction of the input shaft, namely to change the mounting side of a motor. Moreover, when a hollow shaft is used as the input shaft and arranged to pass through the end plates, a hollow-type device can easily be realized.

(Second Embodiment)

Figure 5C:
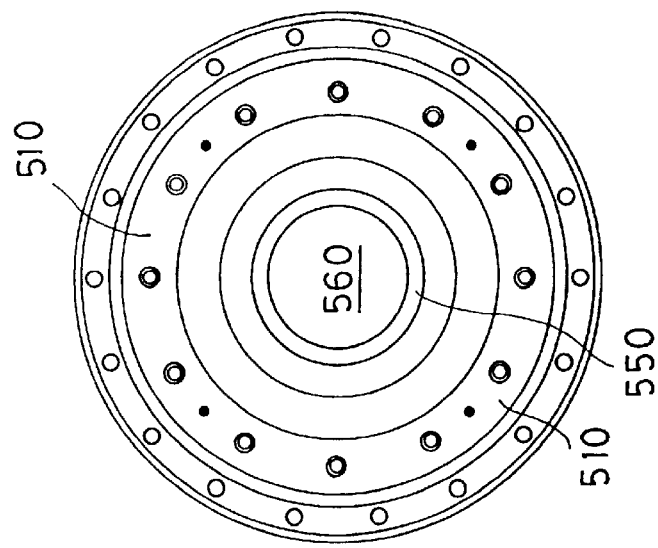
FIG. 5 shows a wave gear drive of a second embodiment according to the present invention, wherein (A) is a side view viewed form arrow A, (B) is a longitudinal sectional view taken along the axial direction, and (C) is a side view viewed from arrow C.
Figure 5B:
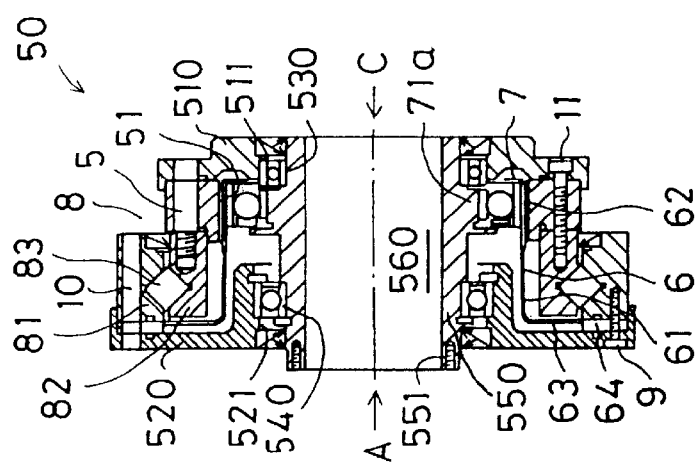
Figure 5A:
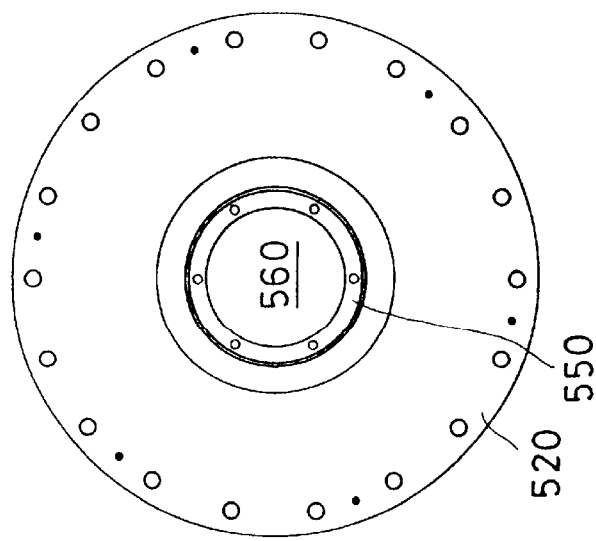

FIG. 5 shows a wave gear drive of a second embodiment according to the present invention. Since the basic structure of the wave gear drive 50 of this embodiment is similar to that of the first embodiment, corresponding elements are denoted by the same reference numerals and explanations thereof will be omitted.

The characteristic feature of the wave gear drive 50 of this embodiment is that a hollow-type wave gear drive is constituted by using a hollow-type input shaft. For this purpose, first and second end plates 510 and 520 of both sides of this embodiment is made to be an annular plate formed therein with a center hole of similar and a hollow input shaft 550 is supported rotatably in a condition that it passes through the center holes of the end plates. More specifically, the hollow input shaft 550 is supported rotatably on inner circumferential surfaces of the end plates 510 and 520 via bearing 530 and 540. One end 551 of the hollow input shaft 550 projects slightly form the end plate 520, to which an output shaft of a drive motor (not shown) is connected. In the present embodiment, a rigid cam plate 71a of a wave generator 7 as one of the components of the wave gear mechanism is formed integrelly on the input shaft 550. The remaining portions are the same as those in the first embodiment.

According to the wave gear drive 50 as constituted above, the similar effects as those obtained by the device of the first embodiment can be obtained. In addition, since the through hole 560 is formed at the center of the device, it is possible to use this portion for arrangement of another members, wiring and the like.

(Third Embodiment)

Figure 6C:
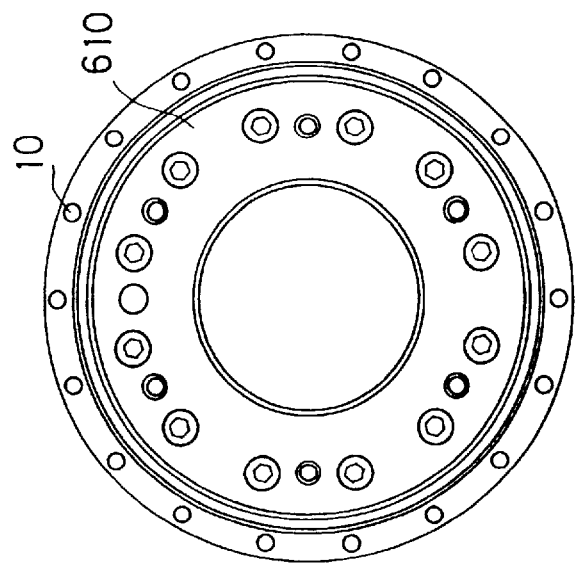
FIG. 6 shows a wave gear drive of a third embodiment according to the present invention, wherein (A) is a side view viewed from arrow A, (B) is a longitudinal sectional view taken along the axial direction, and (C) is a side view viewed from arrow C.
Figure 6B:
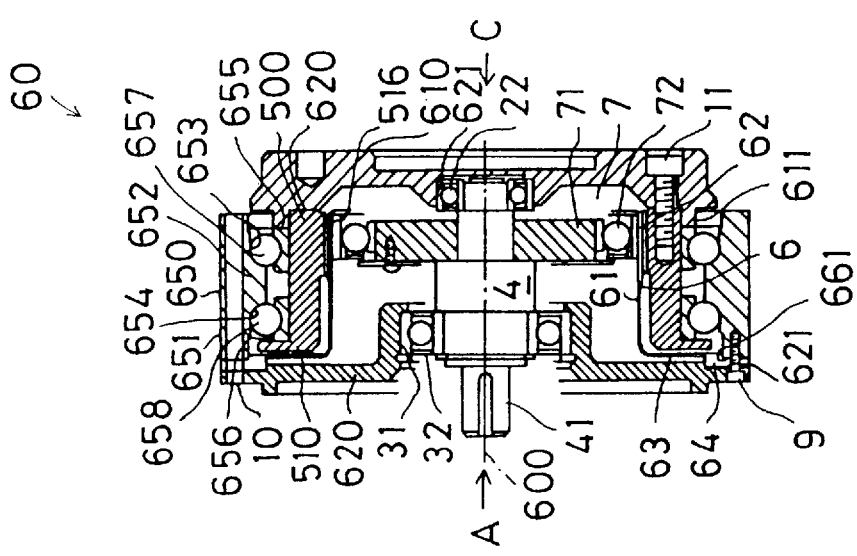
Figure 6A:
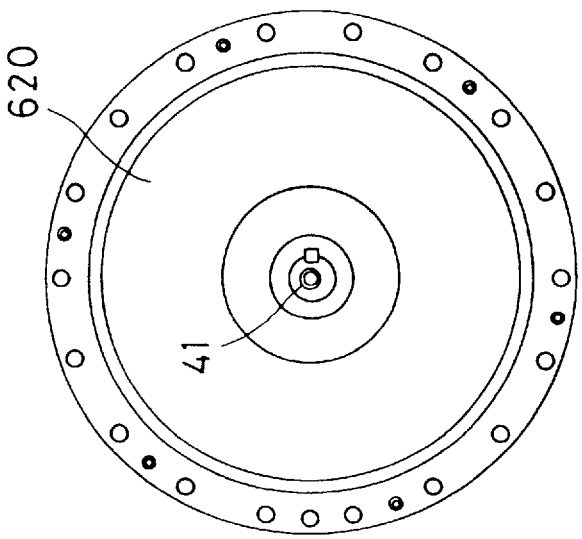

FIG. 6 shows a wave gear drive of a third embodiment according to the present invention. The wave gear drive 60 of this embodiment has the same structure as that in the first embodiment basically but is different in that a double-row ball bearing 650 is used instead of the cross roller bearing 8. In FIG. 6 therefore, portions corresponding to those of the device 1 of the first embodiment are denoted by the same reference numerals.

The wave gear drive 60 of this embodiment is defined at both ends by first and second end plates 610 and 620. The first end plate 610 is formed at its center of an inner-side end surface with a circular recess 621, by an inner circumferential surface of which an input shaft 4 arranged along a device axis 600 is rotatably supported at its end via a bearing 22. While the second end plate 620 is formed at its center with a through hole 31, by an inner circumferential surface of which the other end of the input shaft 4 is supported rotatably via a bearing 32. The end 41 of the input shaft 4 projects outward from the through hole 31.

Next, between the end plates 610, 620, a wave gear mechanism is incorporated. The wave gear mechanism comprises a circular rigid internal gear 500, a silk-hat-shaped flexible external gear 6 and a wave generator 7. The flexible external gear 6 is constituted by an annular body 61, external teeth 62 formed on an outer circumferential surface on an opening end at one side of the body, an annular diaphragm 63 extending perpendicularly to an outward in the radial direction from the other opening end of the body, and an annular thick boss 64 continuing into the outer edge of the diaphragm 63. The rigid internal gear 500 is provided around the external teeth 62, and is formed on an inner circumferential surface thereof with internal teeth 51 which are engageable with the external teeth 62. The wave generator 7 is fitted into the body 61 where the external teeth 62 are formed.

The wave generator 7 has an elliptical-shaped rigid cam plate 71 and a bearing 72 fitted around the cam plate. The input shaft 4 extends through the center of the rigid cam plate 71 which is fixedly connected to the input shaft 4. The flexible external gear 6 is flexed elliptically at its portion where the external teeth are formed by the wave generator 7 and the external teeth 62 on both ends of the major axis of the elliptical shape are in the condition meshed with the internal teeth 51. The wave generator 6 is rotated by the rotation of the input shaft 4, in accordance with which the meshing portions between the external teeth and the internal teeth are moved in a circumferential direction. Typically, the number of teeth of the external teeth 62 is less by two than that of the internal teeth 51, and when the meshing portion therebetween move in the circumferential direction, relative rotation is produced between the external and internal teeth, which is greatly reduced in speed compared to the input rotation. Since the speed reduction mechanism is known, the detailed explanation thereof is omitted in this specification.

Next, a double-row ball bearing 650 is arranged around the body 61 of the flexible external gear 6, whereby the rigid internal gear 5 and the flexible external gear 6 are set in a condition that they are freely rotatable relative to each other. The ball bearing 650 has a common outer ring 651 which is formed at a middle portion on an inner circumferential surface with an annular projection 652 projecting inward, both sides of which are formed with ball rolling surfaces 653 and 654. Two inner rings 655 and 656 are arranged facing to the ball rolling surfaces, and are fitted on the outer circumferential surface 510 of the rigid internal gear 500 of the wave gear mechanism and supported thereon. A plurality of balls 657 and 658 are inserted rotatably between the outer ring 651 and the respective inner rings 655, 656.

As mentioned above, the rigid internal gear 500 of the present embodiment is made to be an annular member extending from the first end plate 610 to the second end plated 620 so as to support the inner rings 655 and 656 of the bearing 650 on its outer circumferential surface, and the inner teeth 51 are formed on the inner circumferential surface of the internal gear at the side of the first end plate 610, while an annular inner-ring press member 510 of large diameter is formed on the end of the internal gear at the side of the second end plate 620 and comes in contact with the side of the inner ring 656. The side of the outer inner ring 655 is in contact with an annular inner-ring press member 611 formed on the inner-side surface of the first end plate 610.

In the present embodiment, the annular boss 64 of the flexible external gear 6 is arranged in a condition that it is sandwiched between the circular end surface 661 of the bearing outer ring 651 and the inner-side end surface 621 of the second end plate 620 facing to the outer ring. These three members are fastened to one another by fastening bolts 9 inserted into a plurality of fastening-bolt holes formed in these members along their circumferential direction. A plurality of another bolt holes are formed in these three members along their circumferential direction in a condition that they pass through these three members, whereby the device 1 of this embodiment can be mounted on a housing or the like of a motor (not shown).

On the other hand, the circular end surface 520 of the rigid internal gear 500 supporting the inner ring of the bearing 650 is intimately contacted with the annular end surface 620 formed on the first end plate 610, and these two members are fastened to each other by fastening bolts 11.

As described in the foregoing, according to the wave gear drive 60 of this embodiment, between the first and second end plates, the input shaft rotatably supported on both ends, the flexible external gear is incorporated, and the ball bearing is arranged. Hence, the outer ring of the ball bearing functions as a housing covering the outer circumferential side of the device. Thus, another member is not required to assemble for a device housing. Further, the distance of the end plates, namely the axial length of the device depends on the axial length of the silk-hat-shaped flexible external gear. When the external gear of short-body type proposed beforehand by the applicant of this application is used, an extremely flat wave gear drive can be realized. Furthermore, without modifying the shape and the like of the rigid internal gear, flexible external gear and wave generator which are the main components of the wave gear mechanism, only the both-side end plates are exchanged to change the projecting direction of the input shaft, namely to change the mounting side of a motor.

(Fourth Embodiment)

Figure 7:
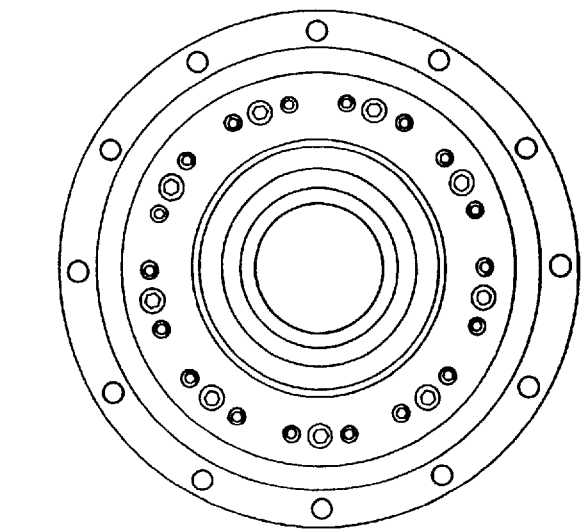
Figure 7B:
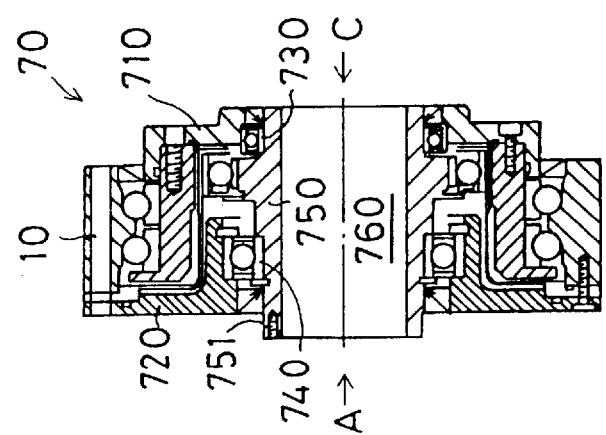
Figure 7A:
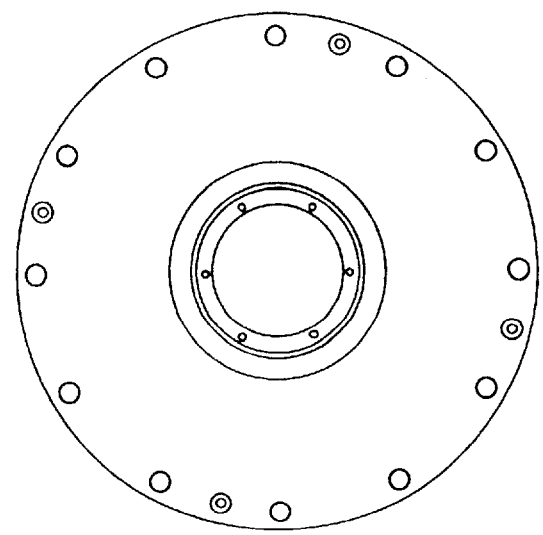

FIG. 7 shows a wave gear drive of a fourth embodiment according to the present invention. The wave gear drive 70 of this embodiment has the basic structure which is the same as that of the third embodiment, and therefore corresponding portions are denoted by the same reference numerals and their explanations will be omitted.

The characteristic feature of the wave gear drive 70 of this embodiment is that a hollow-type wave gear drive is constituted by using a hollow-type input shaft. For this purpose, first and second end plates 710 and 720 of both sides of this embodiment is made to be an annular plate formed therein with a center hole of similar size and a hollow input shaft 750 is supported rotatably in a condition that it passes through the center holes of the end plates. More specifically, the hollow input shaft 750 is supported rotatably on inner circumferential surfaces of the end plates 710 and 720 via bearing 730 and 740. One end 751 of the hollow input shaft 750 projects slightly from the end plate 720, to which an output shaft of a drive motor (not shown) is connected. In the present embodiment, a rigid cam plate 71a of a wave generator 7 as one of the components of the wave gear mechanism is formed integrally on the input shaft 750. The remaining portions are the same as those in the third embodiment.

According the wave gear drive 70 as constituted above, the similar effects as those obtained by the device of the first embodiment can be obtained. In addition, since the through hole 760 is formed at the center of the device, it is possible to use this portion for arrangement of another members, wiring and the like.

Industrial Applicability

As described in the foregoing, the flat wave gear drive of the present invention adopts such a structure that a silk-hat-shaped flexible external gear mechanism is incorporated between the first and second end plates, a bearing is arranged therearound, and the input shaft is rotatably supported at both ends thereof between the first and second end plates. The outer ring of the bearing, therefore, can be utilized as a device housing. Further, since the axial length of the device depends on that of the silk-hat-shaped external gear of the wave gear mechanism, a flat external gear is used to thereby realize a small and compact device of short axial length. Furthermore, positions and the like of a drive motor mounted to the device can easily be changed by modifying only the shape of the both end plates.

On the other hand, according to the device of the present invention, the components of the device as the rigid internal gear, the flexible external gear and the like are fastened to one another at the same time when the device is mounted on a drive motor or the like, so that the number of the components can be reduced. In addition, since the silk-hat-shaped flexible external gear is used, it is possible to enhance torsional strength of the diaphragm compared to the case in which a cup-shaped external gear is used, whereby rigidity of the device can be improved.

I claim:

1. A flat wave gear drive comprising:

a first end plate and a second end plate provided at both ends in an axial direction;

a silk-hat-shaped flexible external gear provided between the end plates, which has an annular body, external teeth formed on an outer circumferential surface of an opening end at a side of said first end plate, an annular diaphragm continuing radially and outwardly from an opening end of the body at a side of said second end plate, and an annular thick boss continuing into an outer edge of the diaphragm;

a circular rigid internal gear provided around said external teeth, which is formed on an inner circumferential surface thereof with internal teeth engageable with said external teeth;

a wave generator provided inside the annular body where said external teeth are formed, which flexes the body radially to engage the external teeth with the internal teeth partially and moves the engaged portions in a circumferential direction;

an input shaft which is fixed to and extends through said wave generator and which is rotatably supported at one end portion thereof on said first end plate and is rotatably supported at the other end portion on said second end plate; and, a bearing provided around the annular body of said flexible external gear, which has an outer ring fixed to said second end plate via said annular boss and an inner ring fixed to said first end plate via said rigid internal gear.

2. A flat wave gear drive according to claim 1, wherein said bearing is a cross roller bearing provided between the annular boss of said flexible external gear and said rigid internal gear, and wherein said outer ring of said cross roller bearing, the annular boss of said flexible external gear and said second end plate are fastened to one another in a condition that the boss of said flexible external gear is sandwiched between an annular end surface of the outer ring of said cross roller bearing and an inner-side circular end surface of said second end plate, while the inner ring of said cross roller bearing, said rigid internal gear and said first end plate are fastened to one another in a condition that said rigid internal gear is sandwiched between a circular end surface of the inner ring of said cross roller bearing and an inner-side circular end surface of said first end plate.

3. A flat wave gear drive according the claim 1, wherein said input shaft is a hollow-type input shaft.

4. A flat wave gear drive according to claim 1, wherein the outer ring is fixed directly to the annular boss.

5. A flat wave gear drive according to claim 4, wherein the annular boss is fixed directly to the second end plate.

6. A flat wave gear drive according to claim 5, wherein the inner ring is fixed directly to the rigid internal gear.

7. A flat wave gear drive according to claim 6, wherein the rigid internal gear is fixed directly to the first end plate.

* * * * *